(12) United States Patent
Zhu et al.

(10) Patent No.: US 11,878,360 B2
(45) Date of Patent: Jan. 23, 2024

(54) ELECTROCHEMICAL MACHINING DEVICE AND METHOD FOR BLISK USING ELECTRODE ARRAY

(71) Applicant: NANJING UNIVERSITY OF AERONAUTICS AND ASTRONAUTICS, Jiangsu (CN)

(72) Inventors: Di Zhu, Jiangsu (CN); Shuanglu Duan, Jiangsu (CN); Jia Liu, Jiangsu (CN); Dong Zhu, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 0 days.

(21) Appl. No.: 18/347,260

(22) Filed: Jul. 5, 2023

(65) Prior Publication Data
US 2023/0356313 A1 Nov. 9, 2023

(30) Foreign Application Priority Data
May 6, 2022 (CN) .......................... 202210485311.6

(51) Int. Cl.
*B23H 9/10* (2006.01)
*B23H 3/04* (2006.01)
*B23H 7/12* (2006.01)

(52) U.S. Cl.
CPC .................. *B23H 9/10* (2013.01); *B23H 3/04* (2013.01); *B23H 7/12* (2013.01)

(58) Field of Classification Search
CPC ............... B23H 3/04; B23H 7/12; B23H 9/10
See application file for complete search history.

(56) References Cited

U.S. PATENT DOCUMENTS

2019/0321902 A1* 10/2019 Yuan ........................ B23H 7/26
2022/0355405 A1* 11/2022 Huttner .................... B23H 3/04

FOREIGN PATENT DOCUMENTS

| CN | 101508047 A | | 8/2009 |
| CN | 106342003 B | | 8/2011 |
| CN | 103752965 A | * | 4/2014 |

(Continued)

OTHER PUBLICATIONS

Notification to Grant Patent Right for Invention for Chinese Application No. 202210485311.6 dated Jun. 21, 2023, 6 pages.

*Primary Examiner* — Nicholas A Smith
(74) *Attorney, Agent, or Firm* — Maine Cernota & Curran

(57) ABSTRACT

The present disclosure provides an electrochemical machining device and a method for a blisk using an electrode array, which relate to the technical field of electrochemical machining. The electrochemical machining device comprises an outer ring-shaped rotating ring, an inner ring-shaped base and a plurality of cathode rods. An inner diameter of the outer ring-shaped rotating ring is larger than an outer diameter of the inner ring-shaped base, and an inner diameter of the inner ring-shaped base is larger than an outer diameter of the blisk. The outer ring-shaped rotating ring and the inner ring-shaped base are coaxially arranged. Middle parts of the cathode rods are connected with the inner ring-shaped base, outer ends of the cathode rods are rotatably connected with the outer ring-shaped rotating ring, and inner ends of the cathode rods are provided with trepanning cathode pieces or radial feeding electrodes.

16 Claims, 8 Drawing Sheets

(56) References Cited

FOREIGN PATENT DOCUMENTS

| CN | 110026630 | A | | 7/2019 | | |
|----|-----------|---|---|--------|---|---|
| CN | 110605445 | A | | 12/2019 | | |
| CN | 112975012 | A | * | 6/2021 | ............. | B23H 11/00 |

* cited by examiner

ELECTROCHEMICAL MACHINING DEVICE AND METHOD FOR BLISK USING ELECTRODE ARRAY

RELATED APPLICATION

This patent application claims the benefit and priority of Chinese Patent Application No. 202210485311.6 filed with the China National Intellectual Property Administration on May 6, 2022, the disclosure of which is incorporated by reference herein in its entirety as part of the present application.

TECHNICAL FIELD

The present disclosure relates to the technical field of electrochemical machining, in particular to an electrochemical machining device and a method for a blisk using an electrode array.

BACKGROUND

As a core component of an aero-engine, the integral member such as a blisk which plays an irreplaceable role is one of the key components that determine the performance of the whole machine and the manufacturing cycle of the aero-engine. However, most of these components are made of materials such as superalloy or titanium alloy, and the dense cascades, complex blade profiles and narrow channels bring many limitations to the traditional numerical control machining on the blisk.

Electrochemical machining is a special process method for removing metal materials using the principle of electrochemical anode dissolution. The method has the characteristics of high machining efficiency, no loss in tools, no stress in machining, wide range of machinable materials and the like. With the outstanding characteristics, the electrochemical machining has the outstanding principle advantages in the manufacturing field of blisks, and the electrochemical machining has become one of the mainstream machining technologies of aero-engine blisks.

In the electrochemical machining on the blisk, rough machining on cascade channels should be carried out first. The machining on the cascade channels is that, by using the formed electrodes, inter-blade channels are formed by enough electrochemical dissolution on blisk blanks according to blade distribution, and most of materials of the blisk blanks are removed in the machining on the cascade channels. There are three types of existing electromechanical machining technology for cascade channels: electrochemical trepanning, radial feeding electrochemical machining and numerical control electrochemical machining. In the patent "Intracavity Variable Tool Cathode for Electrochemical Machining On Large Twisted Blade Blisk", an intra cavity variable tool cathode is disclosed, and the electrochemical trepanning on large twisted blades is carried out by the rotary feeding of the cathode rod and the intra-cavity shape change of the cathode. In the patent "Electrochemical Machining Method for Cathode Blisk Using Non-uniform Speed, Double Rotation and Variable Machining Edge", a method of electrochemical machining using radial feeding is disclosed. In this method, the three-axis compound motion of the blisk rotation and rotary feeding of the tool electrode implement the electrochemical machining on twisted-blade cascade channels. At present, electrochemical trepanning and radial feeding electrochemical machining are mainly single electrode machining. That is, after one cascade channel is completely machined, the next cascade is begun to be machined. However, for numerical control electrochemical machining, some patents have put forward a multi-electrode electrochemical machining method of a blisk. For example, in the patent "Electrochemical Machining Method For Inter-blade Channels of Integral Impeller Using Spiraling Feed Of Multi-electrode", a machining method of cascade channels which are synchronously machined by multi-tube electrodes is proposed. At the same time, in the patent "Electrochemical Machining Device For Integrated Impeller Multi-channel", the above-mentioned electrochemical machining method of multi-tube electrode is supplemented, and an electrochemical machining device for multi-tube electrodes based on transmission of a crank rocker mechanism is proposed, so synchronous electrochemical machining on multiple cascade channels can be implemented.

At present, the machining efficiency of a single electrode has not been greatly improved, and an electrochemical machining method using multi-electrodes has been proposed in a numerical control electrochemical machining method. Therefore, for electrochemical trepanning or radial feeding electrochemical machining, it is also urgent to carry out the research on multi-electrode electrochemical machining. It is of great significance to shorten the manufacturing cycle for the blisk by reasonably designing a machining device and increasing the number of electrodes, so as to improve the machining efficiency on the blisk.

SUMMARY

In order to solve the above technical problems, the present disclosure provides an electrochemical machining device and a method for a blisk using an electrode array to achieve efficient electrochemical trepanning or radial feeding electrochemical machining on a twisted-blade blisk.

In order to achieve the purpose, the present disclosure provides the following scheme.

The present disclosure provides an electrochemical machining device for a blisk using an electrode array. The electrochemical machining device includes an outer ring-shaped rotating ring, an inner ring-shaped base and a plurality of cathode rods. An inner diameter of the outer ring-shaped rotating ring is larger than an outer diameter of the inner ring-shaped base, and an inner diameter of the inner ring-shaped base is larger than an outer diameter of the blisk. The outer ring-shaped rotating ring and the inner ring-shaped base are coaxially arranged. Middle parts of the cathode rods are connected with the inner ring-shaped base, and outer ends of the cathode rods are rotatably connected with the outer ring-shaped rotating ring, and inner ends of the cathode rods are provided with trepanning cathode pieces or radial feeding electrodes.

Optionally, each of the cathode rods includes a rod body and a rod head. A middle part of the rod body is movably connected with the inner ring-shaped base, an outer end of the rod body is rotatably connected with one end of the rod head, and another end of the rod head is rotatably connected with the outer ring-shaped rotating ring. An inner end of the rod body is provided with a corresponding one of the trepanning cathode pieces or a corresponding one of the radial feeding electrodes.

Optionally, a spiral groove is provided in a side wall of the rod body, and the spiral groove is connected with one end of a guide block, and another end of the guide block is connected with the inner ring-shaped base.

Optionally, an electrolyte inlet is provided in a portion of the rod body which is between the spiral groove and the inner end of the rod body. The electrolyte inlet communicates with the corresponding one of the trepanning cathode pieces.

Optionally, the other end of the rod head is hinged with one end of a connecting rod, and another end of the connecting rod is hinged with the outer ring-shaped rotating ring.

Optionally, the outer ring-shaped rotating ring is connected with a driving mechanism.

Optionally, a cathode base is arranged between the cathode rod and the trepanning cathode piece, and the cathode base is used for fixing the trepanning cathode piece.

Optionally, a power supply is also included. The cathode rod is connected with a negative electrode of the power supply, and the blisk is connected with a positive electrode of the power supply.

The present disclosure also discloses an electrochemical machining method based on the electrochemical machining device for a blisk using an electrode array, and the method includes the following steps.

In step (a), a blisk 8 is mounted on a rotary table concentric with the inner ring-shaped base 2.

In step (b), an electrolyte circulating system is started, and an electrolyte is fed to a machining gap between each of the inner ends of ones of the cathode rods and the blisk.

In step (c), a power supply is started to electrify cathode rods 3 and the blisk 8.

In step (d), when an outer ring-shaped rotating ring 1 rotates clockwise, a connecting rod 6 is driven to rotate relative to the outer ring-shaped rotating ring 1, the cathode rods 3 are pushed to rotate and feed by the rotation of the connecting rod 6, and when the power supply is switched on, the three-dimensional contours of a group of cascade channels 8-1 are formed by electrochemically dissolving the blisk 8.

In step (e), after the group of cascade channels 8-1 are completely machined, electrolyte feeding is stopped, the power supply is cut off, the outer ring-shaped rotating ring 1 is enabled to rotate counterclockwise, and the cathode rods 3 is enabled to return to initial positions.

In step (f), the blisk 8 is rotated and indexed, and the above steps (a) to (e) are repeated until remaining cascade channels 8-1 are completely machined.

In step (g), after the group of cascade channels and the remaining cascade channels of the blisk are both completely machined, the power supply and the electrolyte circulating system are switched off.

Compared with the prior art, the present disclosure has the following technical effects.

Firstly, compared with the traditional machining using a single electrode one by one, the cascade channels of the blisk are machined simultaneously by using an electrode array in the present disclosure In this way, a plurality of cascades can be machined at one time, and even all cascade channels can be machined at one time, so that the machining efficiency on the blisk is greatly improved, and the manufacturing cycle is greatly shortened.

Secondly, during the electrochemical trepanning or radial feeding electrochemical machining, the cathode rotates and feeds, and the rotation of the blisk is superimposed. At the same time, the combined feeding movement achieves the electrochemical process, so that the profile of the blade is coincided better and the electrochemical machining on the twisted blade blisk is efficiently completed.

Thirdly, a transmission mechanism designed in the present disclosure can achieve synchronous rotation and radial feeding of a plurality of tool electrodes only by simple three-axis linkage, so that the machine tool structure of a multi-electrode electrochemical machining is greatly simplified. And, electrochemical trepanning or radial feeding electrochemical machining can be implemented by replacing the cathode body, which has higher process adaptability.

BRIEF DESCRIPTION OF THE DRAWINGS

To more clearly illustrate the present embodiment of the present disclosure, or the technical scheme, the following briefly introduces the attached figures to be used in the present embodiment. The attached figures in the following description show merely some embodiments of the present disclosure, and those skilled in the art may still derive other drawings according to these attached figures without creative efforts.

Figure 1:
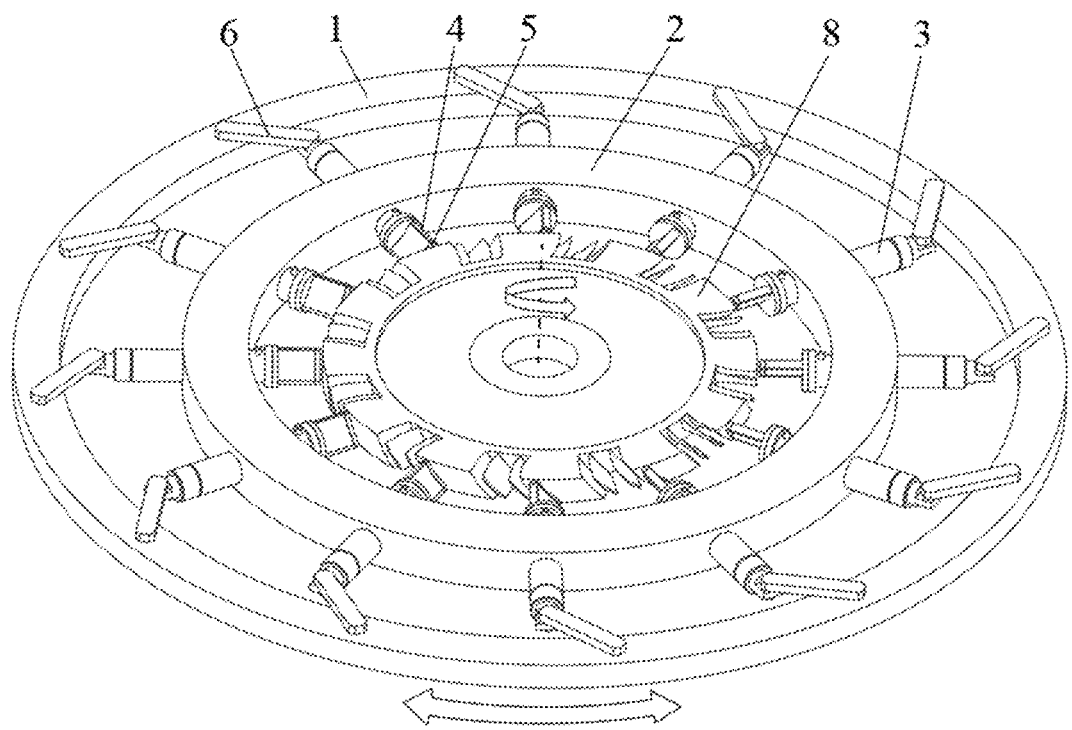
FIG. 1 is a schematic diagram of electrochemical machining on a blisk using multiple electrodes according to some embodiments of the present disclosure.
Figure 2:
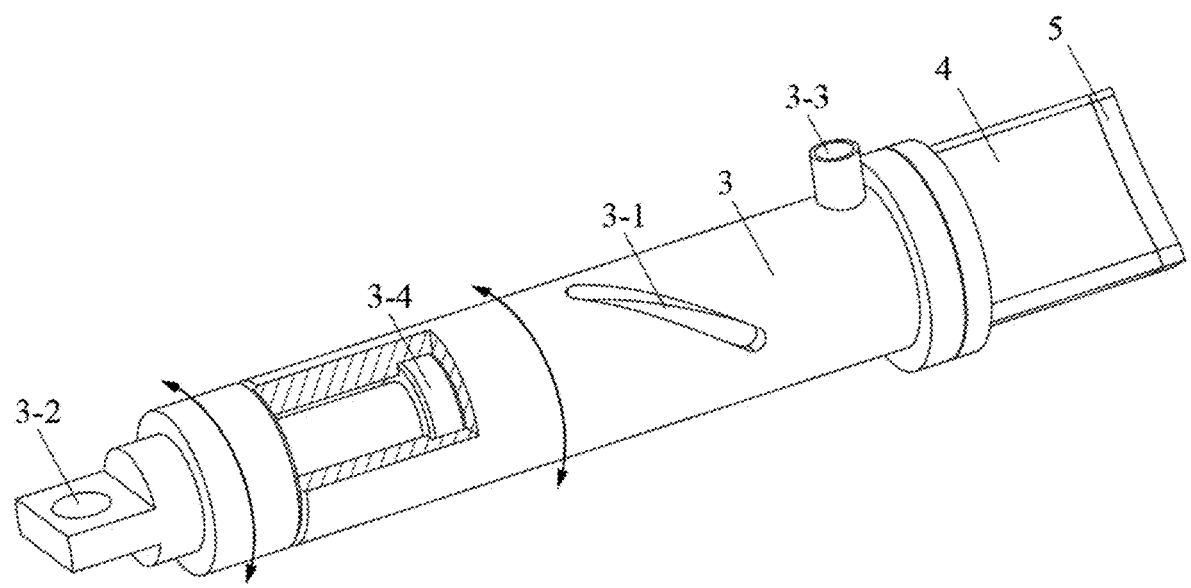
FIG. 2 is a schematic diagram of a cathode rod according to some embodiments of the present disclosure.
Figure 3:
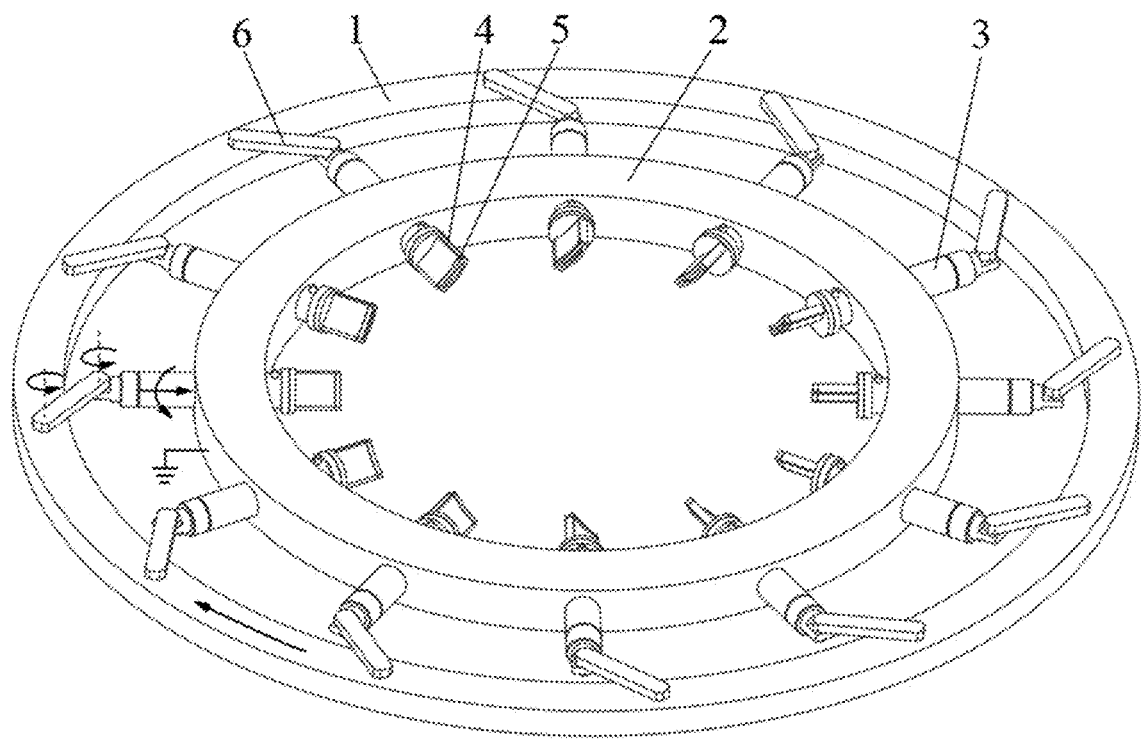
FIG. 3 is a diagram showing a state of an electrochemical machining device using multiple electrodes before machining according to some embodiments of the present disclosure.
Figure 4:
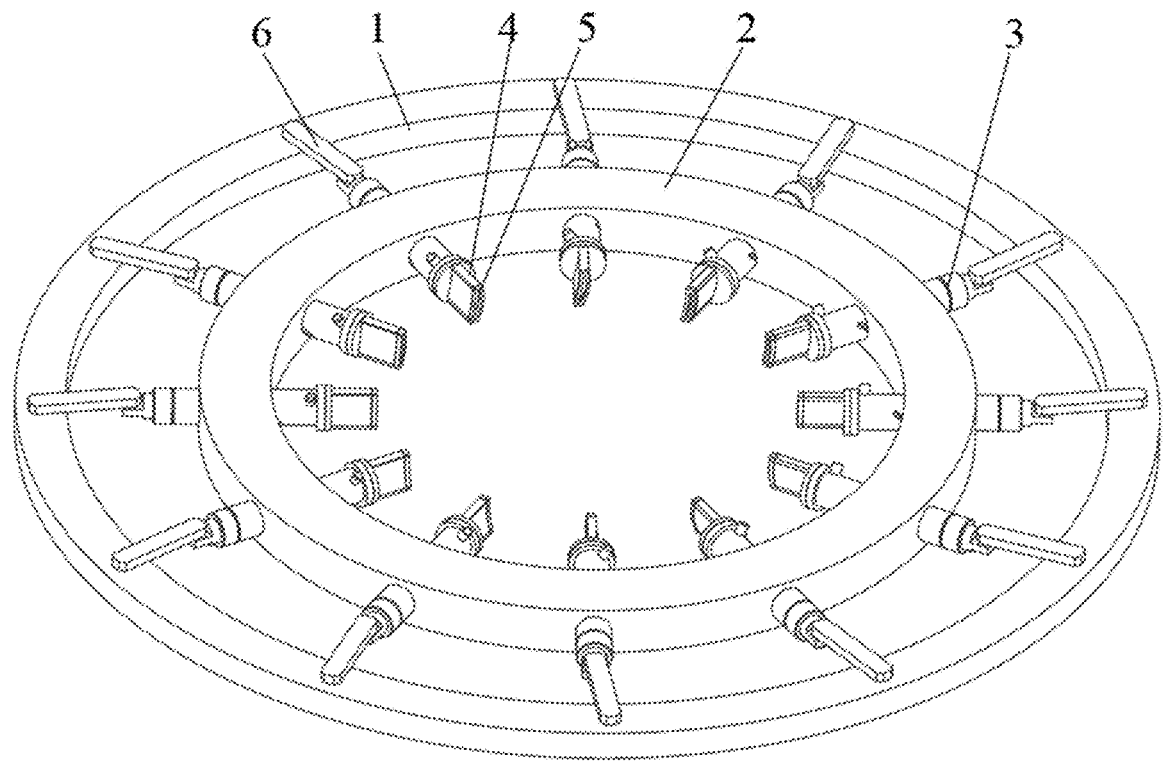
FIG. 4 is a diagram showing a state of an electrode electrochemical machining device using multiple electrodes after feeding according to some embodiments of the present disclosure.
Figure 5:
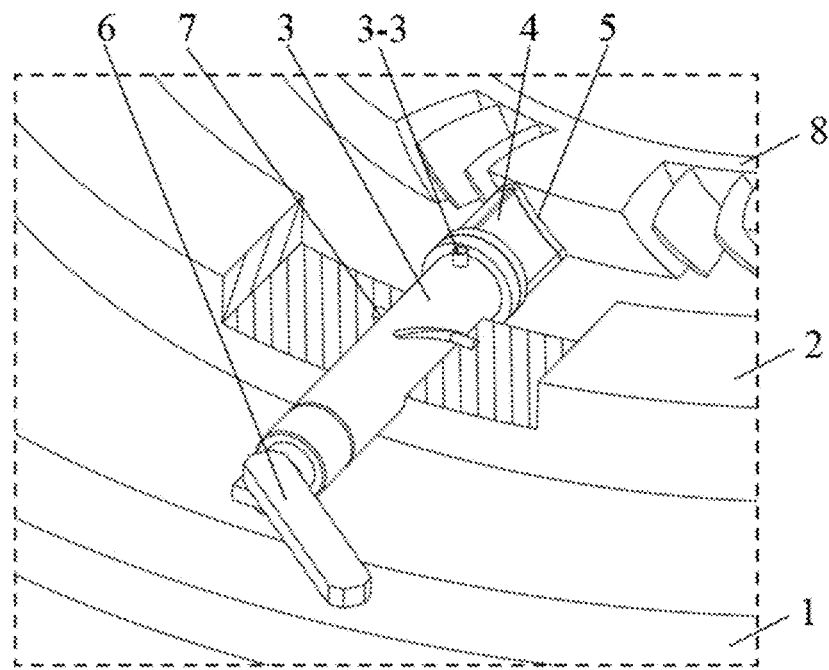
FIG. 5 is a partial schematic diagram of a cathode rod region in FIG. 1 according to some embodiments of the present disclosure.

Reference signs: 1 outer ring-shaped rotating ring; 2 inner ring-shaped base; 3 cathode rod; 3-1 spiral groove; 3-2 connecting hole; 3-3 electrolyte inlet; 3-4 step surface; 4 cathode base; 5 trepanning cathode piece; 6 connecting rod; 7 guide block; 8 blisk; 8-1 cascade channel; and 9 radial feeding electrode; 10 power supply.

DETAILED DESCRIPTION OF THE EMBODIMENTS

The following clearly and completely describes the technical scheme in the present embodiments of the present disclosure with reference to the attached figures in the present embodiments of the present disclosure. The described embodiments are merely a part rather than all of the present embodiments of the present disclosure. Based on the embodiment in the present disclosure, all other embodiments obtained by the ordinary technical staff in the art under the premise of without contributing creative labor belong to the scope protected by the present disclosure.

Embodiment I

As shown in FIG. 1 to FIG. 7, the embodiment provides an electrochemical machining device for a blisk using an electrode array. The electrochemical machining device includes an outer ring-shaped rotating ring 1, an inner ring-shaped base 2 and a plurality of cathode rods 3. The inner diameter of the outer ring-shaped rotating ring 1 is larger than the outer diameter of the inner ring-shaped base 2, and the inner diameter of the inner ring-shaped base 2 is larger than the outer diameter of a blisk 8. The outer ring-shaped rotating ring 1 and the inner ring-shaped base 2 are coaxially arranged. The middle parts of the cathode rods 3 are connected with the inner ring-shaped base 2, the outer ends of the cathode rods 3 are rotatably connected with the outer ring-shaped rotating ring 1, and the inner ends of the cathode rods 3 are provided with trepanning cathode pieces 5 or radial feeding electrodes 9.

In the specific embodiment, the cathode rod 3 includes a rod body and a rod head. The middle part of the rod body is movably connected with the inner ring-shaped base 2, the outer end of the rod body is rotatably connected with one end of the rod head, and the other end of the rod head is rotatably connected with the outer ring-shaped rotating ring 1. The inner end of the rod body is provided with the trepanning cathode piece 5 or the radial feeding electrode 9. A spiral groove 3-1 is formed in the side wall of the rod body, the spiral groove 3-1 is connected with one end of a guide block 7, and the other end of the guide block 7 is connected with the inner ring-shaped base 2. An electrolyte inlet 3-3 is formed in a portion of the rod body which is between the spiral groove 3-1 and the inner end of the rod body, and the electrolyte inlet 3-3 communicates with the trepanning cathode piece 5. The other end of the rod head is hinged with one end of a connecting rod 6, and the other end of the connecting rod 6 is hinged with the outer ring-shaped rotating ring 1. More specifically, a plurality of penetrating inner holes are formed in the inner ring-shaped base 2 along the radial direction thereof, and each of the inner holes is penetratingly provided with a rod body of one cathode rod 3. The diameter of the rod body is smaller than the inner diameter of the inner hole, so that the rod body can rotate or move linearly in the inner hole. A limiting groove is formed in the side wall of the inner hole, and the other end of the guide block 7 is inserted into a guide groove, so that the rod body rotates along the spiral groove 3-1 when moving linearly.

In a more specific embodiment, an inner hole is formed in the outer end of the rod body, and the bottom of the inner hole is provided with a step surface 3-4. One end of the rod head is provided with a boss, with the cooperation of the boss and the step surface 3-4, relative rotation between the rod body and the rod head can be carried out without linear movement therebetween.

The outer ring-shaped rotating ring 1 is connected with a driving mechanism. The driving mechanism includes a motor for driving the outer ring-shaped rotating ring 1 to forwardly rotate or reversely rotate.

A cathode base 4 is arranged between the cathode rod 3 and the trepanning cathode piece 5, and the cathode base 4 is used for fixing the trepanning cathode piece 5.

In another specific embodiment, a power supply 10 is also included. The cathode rod 3 is connected with a negative electrode of the power supply 10, and the disk 8 is connected with a positive electrode of the power supply 10.

As shown in FIG. 1 to FIG. 5, when the outer ring-shaped rotating ring 1 rotates clockwise, the connecting rod 6 is driven to rotate relative to the outer ring-shaped rotating ring 1, so the position of the connecting rod 6 is changed. Because the connecting rod 6 is hinged with the cathode rod 3, the cathode rod 3 is pushed to slide along the inner hole of the inner ring-shaped base 2 by means of the rotation of the connecting rod 6, the guide block 7 restricts the cathode rod 3 from spirally advancing along the spiral groove 3-1. Therefore, rotary feeding of the trepanning cathode piece 5 or the radial feeding electrode 9 is carried out under the driving of the cathode rod 3. In the machining process, when the trepanning cathode piece 5 or the radial feeding electrode 9 rotates and feeds, the blisk 8 rotates around an axis of the blisk 8, and an electrolyte is introduced into a machining area. When the power supply 10 is switched on, the three-dimensional contours of a plurality of cascade channels 8-1 are formed by electrochemically dissolving the blisk. The feeding of the cathode rod 3 and the rotation of the blisk 8 are carried out synchronously. By means of the spiraling feed of the cathode rod 3 and the rotation of the blisk 8, the combined motion track of these three motions can better coincide with a profile of a blade.

Figure 6:
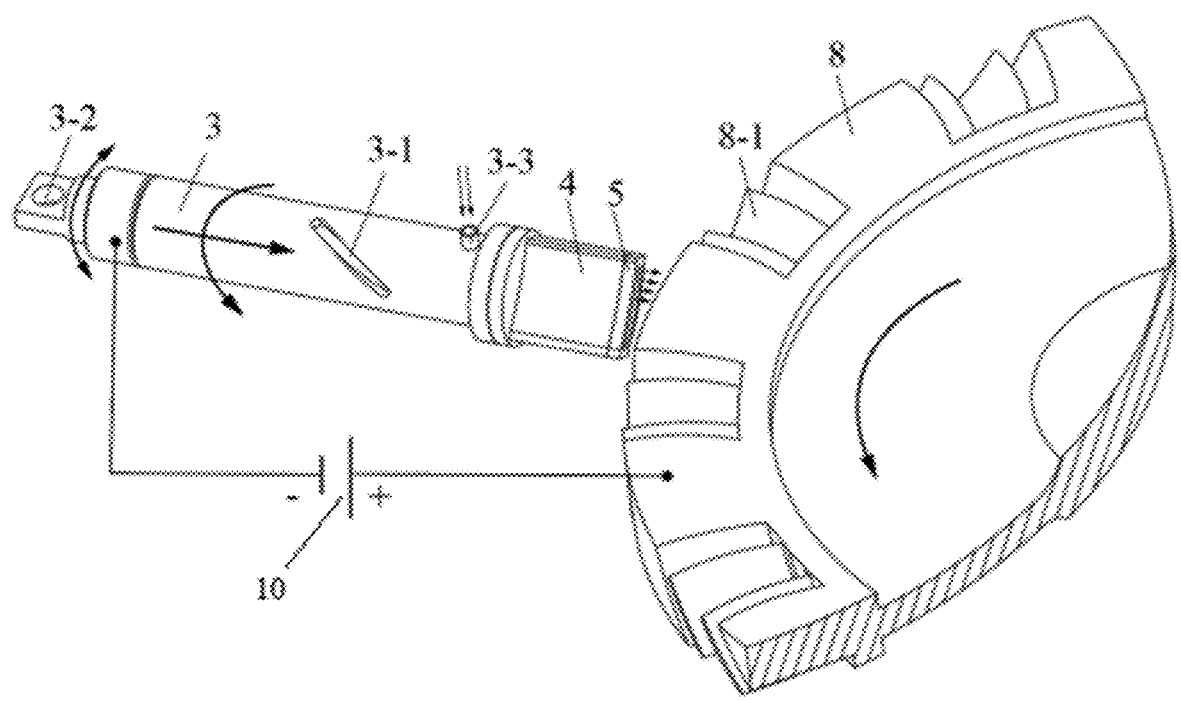
FIG. 6 is a schematic diagram of electrochemical trepanning on a blisk according to some embodiments of the present disclosure.

As shown in FIG. 6, during trepanning electromechanical machining, the cathode body is a tool electrode with pictorial channels similar to the profile of the blade, and trepanning machining can be carried out on the materials. The flowing mode of the electrolyte is a positive flowing mode. That is, the electrolyte flows in from the inlet 3-3, passes through an internal flow channel of the cathode body, then the electrolyte is sprayed from the inside of the trepanning cathode piece 5 into a machining gap. With the spiraling feed of the cathode body, the areas of the blisk which are corresponding to the cathode pieces are electrochemically dissolved and removed, thereby the three-dimensional profile of the blade is obtained.

Figure 7:
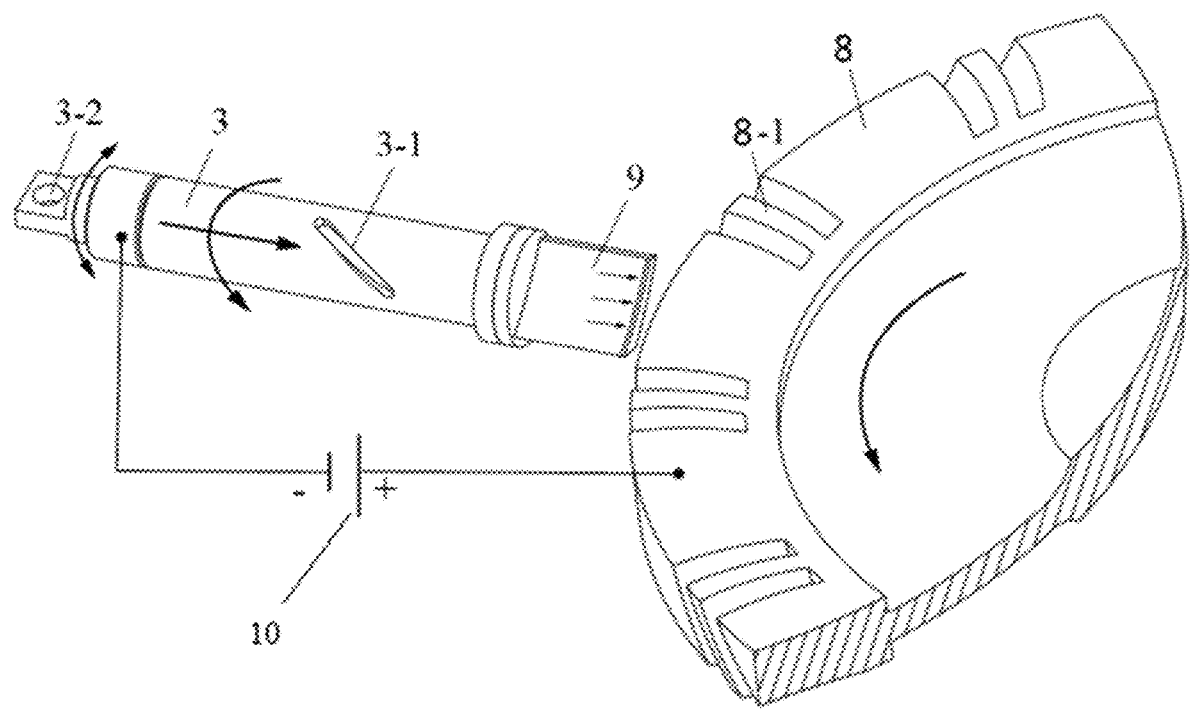
FIG. 7 is a schematic diagram of radical feeding electrochemical machining on a blisk according to some embodiments of the present disclosure.
Figure 8:
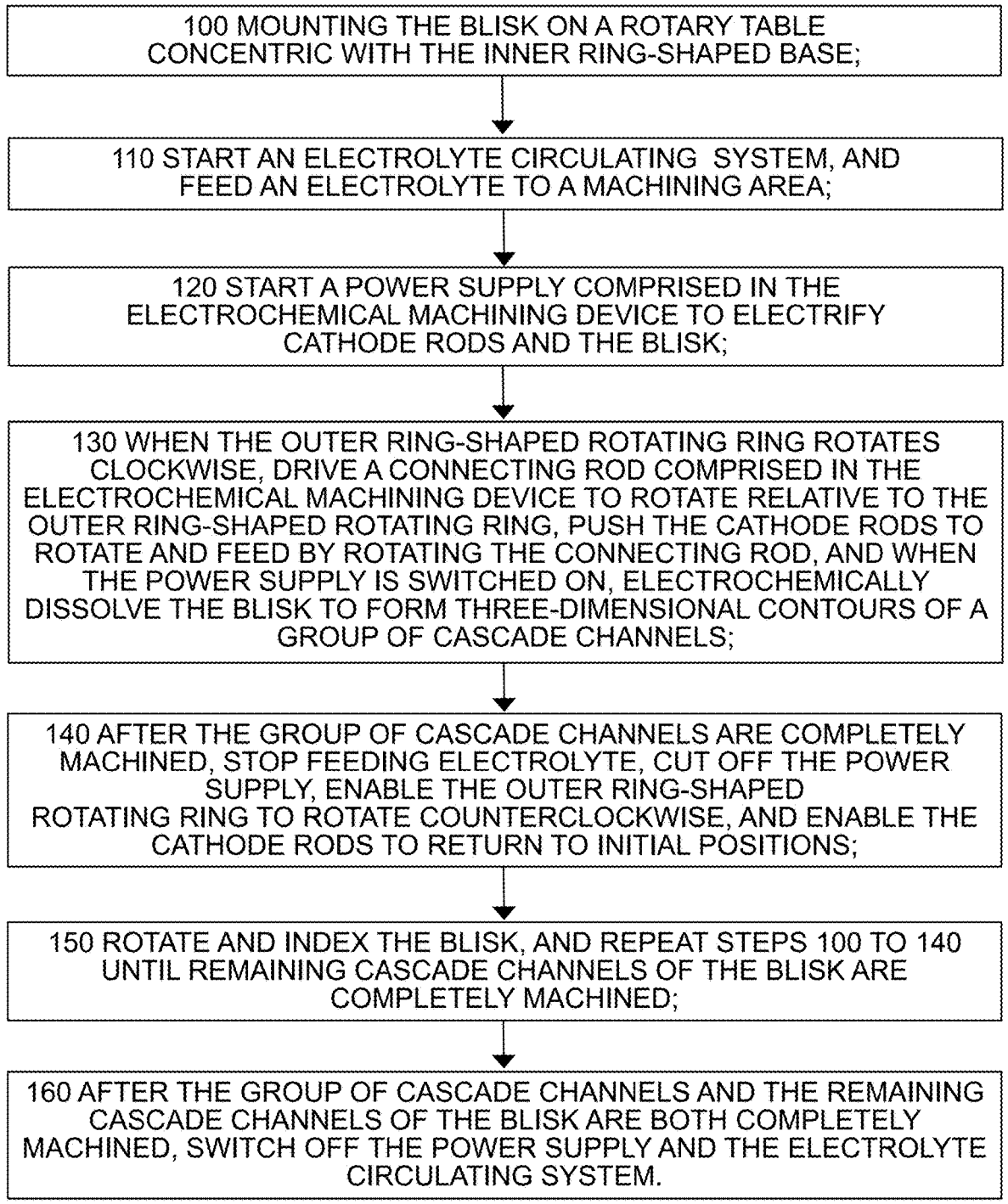
FIG. 8 is schematic flowchart of an electrochemical machining method based on the electrochemical machining device for a blisk using an electrode array according to some embodiments of the present disclosure.

As shown in FIG. 7, during electrochemical machining by radial feeding, the cathode body is a radial feeding electrode 9 having a machining edge at a front end thereof, and a machining surface is an end face of the machining edge. The electrolytic flowing form is side flowing mode. That is, the electrolyte flows from the back of the blade through a root hub of the blade and then flows out from a basin side of the blade. With the spiraling feed of the cathode body, the areas of the blisk which are corresponding to the machining edge are electrochemically dissolved and removed, so the three-dimensional profile of the cascade channel is obtained.

Embodiment II

The embodiment II provides an electrochemical machining method based on the electrochemical machining device for a blisk using the electrode array in the embodiment I, and the method includes the following steps.

In step 100, a blisk 8 is mounted on a rotary table concentric with the inner ring-shaped base 2.

In step 110, an electrolyte circulating system is started, and an electrolyte is fed to a machining gap between each of the inner ends of ones of the cathode rods 3 and the blisk 8.

In step 120, a power supply 10 is started to electrify cathode rods 3 and the blisk 8.

In step 130, when an outer ring-shaped rotating ring 1 rotates clockwise, a connecting rod 6 is driven to rotate relative to the outer ring-shaped rotating ring 1, the cathode rods 3 is pushed to rotate and feed by the rotation of the connecting rod 6, and when the power supply 10 is switched on, the three-dimensional contours of a group of cascade channels 8-1 are formed by electrochemically dissolving the blisk 8.

In step 140, after the group of cascade channels 8-1 are completely machined, electrolyte feeding is stopped, the power supply 10 is cut off, the outer ring-shaped rotating ring 1 is enabled to rotate counterclockwise, and the cathode rods 3 is enabled to return to initial positions.

In step 150, the blisk 8 is rotated and indexed, and the above steps (a) to (e) are repeated until remaining cascade channels 8-1 are completely machined.

In step 160, after the group of cascade channels and the remaining cascade channels of the blisk are both completely machined, the power supply 10 and the electrolyte circulating system are switched off.

It needs to be noted that for those skilled in the art, obviously the present disclosure is not limited to the details of the above exemplary embodiment, and the present disclosure can be achieved in other specific forms without departing from the spirit or essential characteristics of the present disclosure. Therefore, for every point, the embodiments should be regarded as exemplary embodiments and are unrestrictive. The scope of the present disclosure is restricted by the appended claims rather than the above description. Therefore, all changes, including the meanings and scopes of equivalent elements relative to the claims, are aimed to be included in the present disclosure, and any mark of attached figures in the claims should not be regarded as limitation to the involved claims.

Specific examples are used for illustration of the principles and implementation modes of the present disclosure. The description of the above-mentioned embodiments is used to help illustrate the method and the core principles of the present disclosure; and meanwhile, for those skilled in the art, it can be made various modifications in terms of specific embodiments and scope of application in accordance with the principles of the present disclosure. In conclusion, the content of this specification shall not be construed as a limitation to the present disclosure.

What is claimed is:

1. An electrochemical machining device for a blisk using electrode array, comprising:
   an outer ring-shaped rotating ring;
   an inner ring-shaped base; and
   a plurality of cathode rods, wherein an inner diameter of the outer ring-shaped rotating ring is larger than an outer diameter of the inner ring-shaped base, and an inner diameter of the inner ring-shaped base is larger than an outer diameter of the blisk;
   the outer ring-shaped rotating ring and the inner ring-shaped base being coaxially arranged; and
   middle parts of the cathode rods are connected with the inner ring-shaped base, outer ends of the cathode rods are rotatably connected with the outer ring-shaped rotating ring, and inner ends of the cathode rods are provided with trepanning cathode pieces or radial feeding electrodes.

2. The electrochemical machining device for a blisk using electrode array according to claim 1, wherein:
   each of the cathode rods comprises a rod body and a rod head;
   a middle part of the rod body is movably connected with the inner ring-shaped base, an outer end of the rod body is rotatably connected with one end of the rod head, and an other end of the rod head is rotatably connected with the outer ring-shaped rotating ring; and
   an inner end of the rod body is provided with a corresponding one of the trepanning cathode pieces or a corresponding one of the radial feeding electrodes.

3. The electrochemical machining device for a blisk using electrode array according to claim 2, wherein:

a spiral groove is formed in a side wall of the rod body, the spiral groove being connected with one end of a guide block; and
an other end of the guide block is connected with the inner ring-shaped base.

4. The electrochemical machining device for a blisk using electrode array according to claim 3, wherein:
   an electrolyte inlet is formed in a portion of the rod body which is between the spiral groove and the inner end of the rod body; and
   the electrolyte inlet communicates with the corresponding one of the trepanning cathode pieces.

5. The electrochemical machining device for a blisk using electrode array according to claim 2, wherein:
   the other end of the rod head is hinged with one end of a connecting rod, and an other end of the connecting rod is hinged with the outer ring-shaped rotating ring.

6. The electrochemical machining device for a blisk using electrode array according to claim 1, wherein:
   a cathode base is arranged between the cathode rod and the trepanning cathode piece, and the cathode base is used for fixing the trepanning cathode piece.

7. The electrochemical machining device for a blisk using electrode array according to claim 1, also comprising:
   a power supply, wherein the cathode rod is connected with a negative electrode of the power supply, and the blisk is connected with a positive electrode of the power supply.

8. An electrochemical machining method based on an electrochemical machining device for a blisk using electrode array according to claim 1, comprising the following steps:
   (a) mounting the blisk on a rotary table concentric with the inner ring-shaped base;
   (b) starting an electrolyte circulating system, and feeding an electrolyte to a machining gap between each of the inner ends of ones of the cathode rods and the blisk;
   (c) starting a power supply comprised in the electrochemical machining device to electrify cathode rods and the blisk;
   (d) when the outer ring-shaped rotating ring rotates clockwise, driving a connecting rod comprised in the electrochemical machining device to rotate relative to the outer ring-shaped rotating ring, pushing the cathode rods to rotate and feed by rotating the connecting rod, and when the power supply is switched on, electrochemically dissolving the blisk to form three-dimensional contours of a group of cascade channels;
   (e) after the group of cascade channels are completely machined, stopping feeding electrolyte, cutting off the power supply, enabling the outer ring-shaped rotating ring to rotate counterclockwise, and enabling the cathode rods to return to initial positions;
   (f) rotating and indexing the blisk, and repeating steps (a) to (e) until remaining cascade channels of the blisk are completely machined; and
   (g) after the group of cascade channels and the remaining cascade channels of the blisk are both completely machined, switching off the power supply and the electrolyte circulating system.

9. The electrochemical machining method of claim 8, wherein:
   each of the cathode rods comprises a rod body and a rod head;
   a middle part of the rod body is movably connected with the inner ring-shaped base, an outer end of the rod body is rotatably connected with one end of the rod head, and an other end of the rod head is rotatably connected with the outer ring-shaped rotating ring; and an inner end of the rod body is provided with a corresponding one of the trepanning cathode pieces or a corresponding one of the radial feeding electrodes.

10. The electrochemical machining method of claim 9, wherein:

a spiral groove is formed in a side wall of the rod body, the spiral groove being connected with one end of a guide block; and an other end of the guide block is connected with the inner ring-shaped base.

11. The electrochemical machining method of claim 10, wherein:

an electrolyte inlet is formed in a portion of the rod body which is between the spiral groove and the inner end of the rod body; and the electrolyte inlet communicates with the corresponding one of the trepanning cathode pieces.

12. The electrochemical machining method of claim 9, wherein:

the other end of the rod head is hinged with one end of a connecting rod, and an other end of the connecting rod is hinged with the outer ring-shaped rotating ring.

13. The electrochemical machining method of claim 8, wherein the outer ring-shaped rotating ring is connected with a driving mechanism.

14. The electrochemical machining method of claim 8, wherein:

a cathode base is arranged between the cathode rod and the trepanning cathode piece, and the cathode base is used for fixing the trepanning cathode piece.

15. The electrochemical machining method of claim 8, wherein the cathode rod is connected with a negative electrode of the power supply, and the blisk is connected with a positive electrode of the power supply.

16. The electrochemical machining device for a blisk using electrode array according to claim 1, wherein the outer ring-shaped rotating ring is connected with a driving mechanism.

* * * * *